A. P. ROUTT.
Cultivator.
No. 64,370.  Patented Apr. 30, 1867.
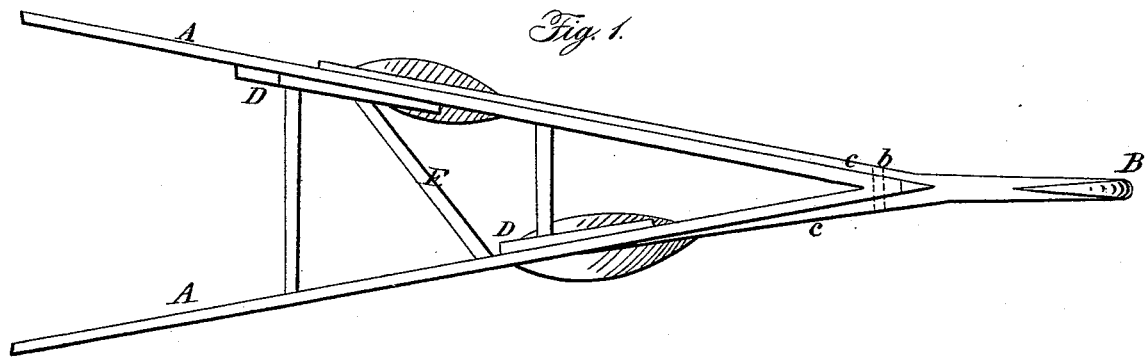
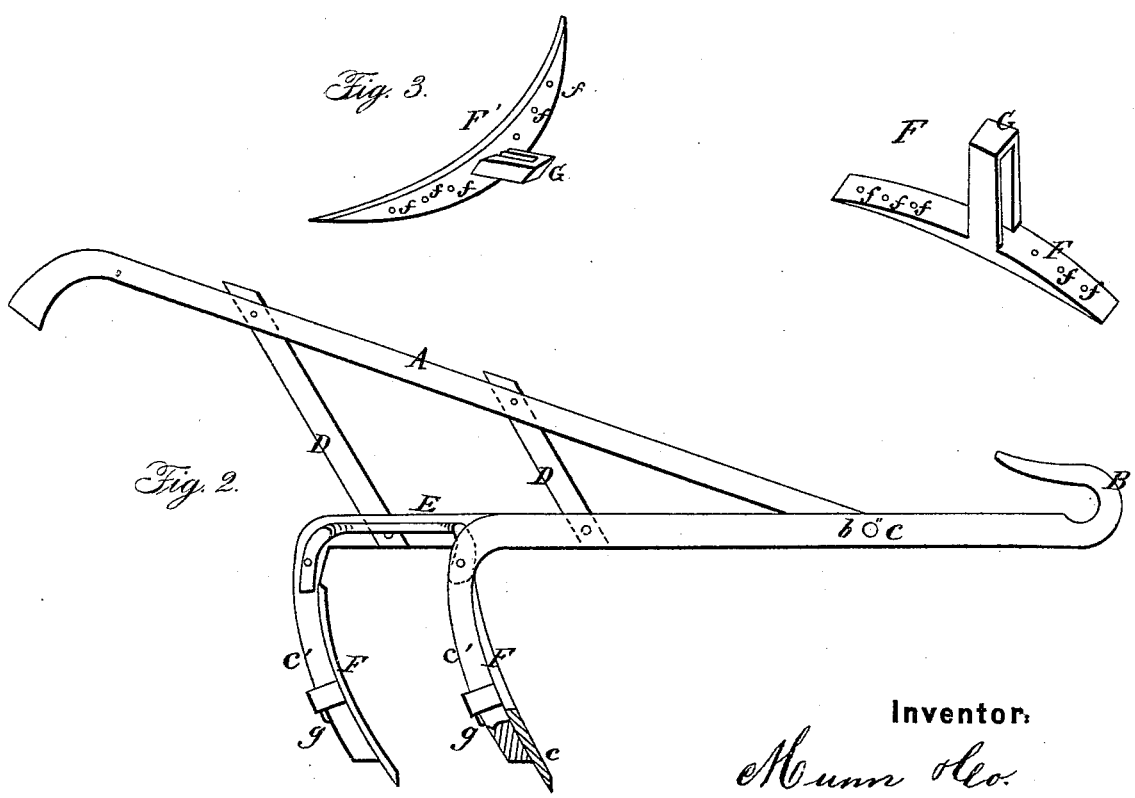
Witnesses:
Chas. D. Smith
N. K. Ellsworth
Inventor:
Munn & Co.
attorneys for
Ansell P. Routt
Per O. Knight
Supt.

United States Patent Office.

ANSELL P. ROUTT, OF LIBERTY MILLS, VIRGINIA.

Letters Patent No. 64,370, dated April 30, 1867.

CULTIVATORS.

*The Schedule referred to in these Letters Patent and making part of the same.*

TO ALL WHOM IT MAY CONCERN:

Be it known that I, ANSELL P. ROUTT, of Liberty Mills, in the county of Orange, and State of Virginia, have invented a new and useful improvement in Cultivators; and I do hereby declare the following to be a full and exact description of the same, reference being had to the accompanying drawings, which are made part of this specification, and in which—

Figure 1 is a plan of a cultivator, illustrating my invention.

Figure 2 is a side elevation of the same.

Figure 3 is a detached view, illustrating the form of the changeable, reversible, and adjustable shovel and plough designed to be in this implement.

Similar letters of reference indicate corresponding parts in the several figures.

This invention relates to a cultivator having two strong iron beams, the rear extremities of which are bent downward so as to form curved shanks or sheths, to which the shares, either of the shovel or plough kind, are attached by means of loops and keys, and which are made to more securely retain the shovels or ploughs in any position in which they may be adjusted by having their extremities pointed and bent so as to enter small holes or notches which are formed in the back of each plough or shovel, as hereinafter explained.

In order that others skilled in the art to which my invention appertains may be enabled to fully understand and use the same, I will proceed to describe it with reference to the accompanying drawings.

A A may represent the handles whereby the implement is guided as it is drawn over the ground by a team attached to the draught-iron B, which is securely applied to the forward ends of the iron beams C C. The beams and handles diverge from the front, where they are connected together by means of the iron bolt b. D D are braces, suitably bolted to the handles and beams; and E is an iron brace, riveted to the rear ends of the respective beams for the purpose of bracing the latter asunder when in operation. Riveting is the preferred means for attaching the brace E, as they are more efficient than screw-bolts for holding the latter in place. The rear ends of the iron beams C C are bent downward and forward, as shown in the elevation, fig. 2, so as to form shanks or sheths C' C' for the attachment of the shares, either in the form of shovels, such as shown at F, or ploughs, at F', fig. 3. These shovels or ploughs are changeable at will, and they are reversible, as well as adjustable, vertically. Each shovel, as also each plough, is made with a penetrating point at each end, so that, by turning it, the position of the ends may be reversed, thus enabling the idle point to be brought into requisition when the working point has become worn or damaged by use. The shovel F is attached to the sheth or shank C' by means of the loop G and keys g, said loop being welded, or otherwise securely attached, to the shovel. When the shovel is applied to the shank and tightened thereon by the keys or wedges the pointed extremity e of the sheth enters one of the holes or notches f in the back of the shovel, the latter being thereby effectually steadied in its operating position. A series of notches or holes is formed in each shovel, so that one of them shall be in position to receive the pointed end of the sheth when the shovel is raised or lowered upon the latter for the purpose of varying the degree of penetration into the earth. The plough F' is also formed with a series of notches or holes, f, and is applied and adjusted in the same manner as the shovel. The peculiar curvature of the shank or sheth C' is such as to adapt it to retain the shovel or plough in its proper operating position under the various adjustments to which it is subject.

Having thus described my invention, what I claim as new herein, and desire to secure by Letters Patent, is—

The changeable, reversible, and adjustable share, secured by loops G and keys or wedges g upon the curved sheths or shanks C', whose points enter the holes or notches in the back of the shovel or plough to secure and steady it in any position to which it may be adjusted, substantially as described.

To the above specification of my improvement in cultivators I have set my hand this thirteenth day of February, 1867.

ANSELL P. ROUTT.

Witnesses:
GEO. W. ROTHWELL,
S. C. KEMON.